United States Patent [19]

Barnes

[11] 4,288,458

[45] Sep. 8, 1981

[54] FISH SILAGE

[75] Inventor: Edward Barnes, Orwell, England

[73] Assignee: BP Nutrition (UK) Limited, London, England

[21] Appl. No.: 94,851

[22] Filed: Nov. 16, 1979

Related U.S. Application Data

[63] Continuation of Ser. No. 901,510, May 1, 1978, abandoned.

[51] Int. Cl.$^3$ .............................................. A23J 1/04
[52] U.S. Cl. .................................... 426/7; 426/643
[58] Field of Search ................ 426/7, 55, 56, 59, 643, 426/657

[56] References Cited

U.S. PATENT DOCUMENTS

| | | | |
|---|---|---|---|
| 1,550,268 | 8/1925 | Kramer et al. | 426/7 |
| 2,560,011 | 7/1951 | Trudel | 426/7 |
| 3,003,880 | 10/1961 | Erickson | 426/7 |
| 3,041,174 | 6/1962 | Ehlert | 426/7 |
| 3,561,973 | 2/1971 | Rutman | 426/7 |
| 3,924,005 | 12/1975 | Bosund et al. | 426/7 |
| 4,016,295 | 4/1977 | Burrows et al. | 426/643 X |

FOREIGN PATENT DOCUMENTS

| | | | |
|---|---|---|---|
| 49-13976 | 4/1974 | Japan | 426/7 |
| 246148 | 7/1926 | United Kingdom | 426/55 |

*Primary Examiner*—Robert A. Yoncoskie
*Attorney, Agent, or Firm*—Brooks, Haidt, Haffner & Delahunty

[57] ABSTRACT

This invention relates to a process for producing liquefied fish protein by liquefying fish mince using preformed fish silage as the liquid medium.

11 Claims, 1 Drawing Figure

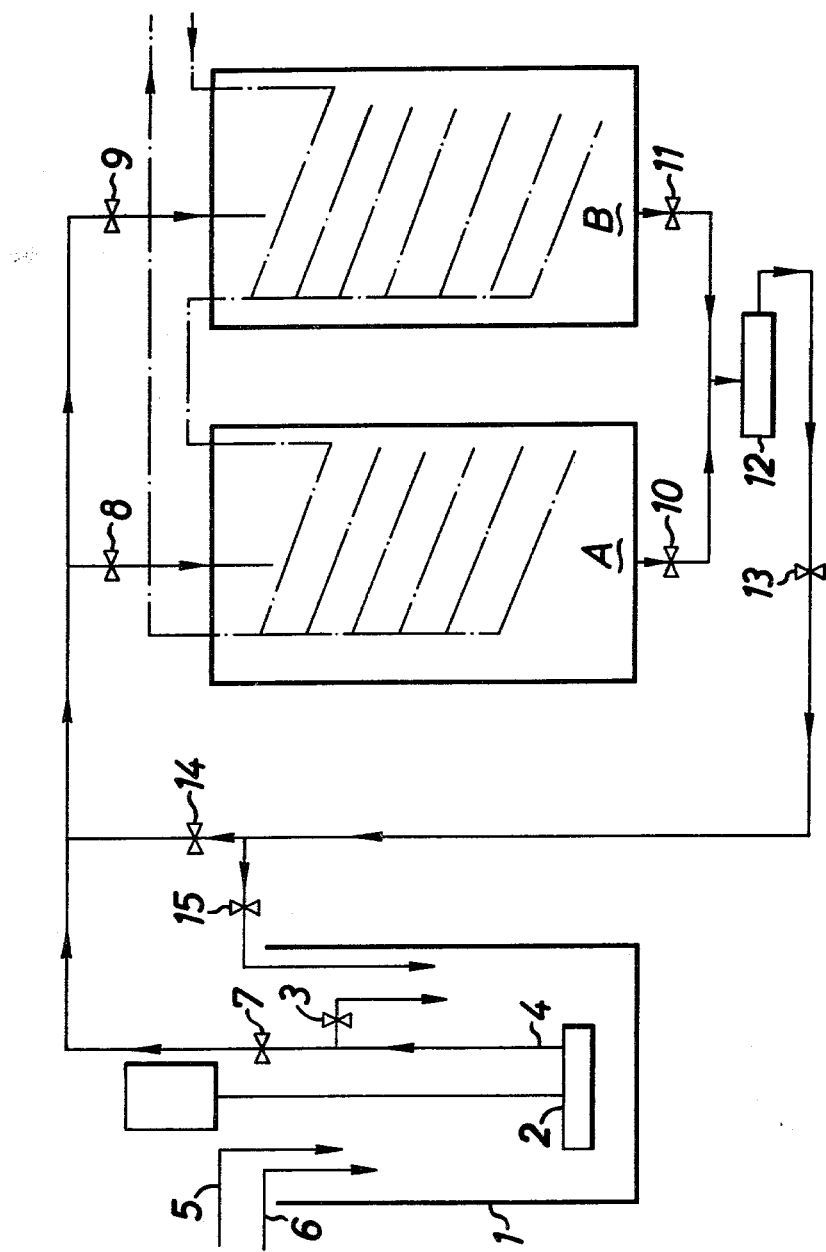

FISH SILAGE

This is a continuation of application Ser. No. 901,510, filed May 1, 1978, now abandoned.

The present invention relates to a process for producing fish silage also known as liquefied fish protein.

By "fish silage" is meant here and throughout the specification a liquid fish product made from whole fish or parts of fish that are liquefied by the action of naturally occurring enzymes in the fish in the presence of an additive which is capable of initiating or accelerating the liquefying process. The enzymes break down fish proteins into smaller soluble units, and the acid helps to speed up their activity while preventing bacterial spoilage. Hitherto, fish silage has been produced by vigorously agitating fish mince with organic or mineral acids. However, fish mince, which is a semisolid becomes even more viscous on addition of the acid and therefore needs heavy duty equipment to vigorously agitate and liquefy such a mass. After a period, the fish is liquefied and the liquefied mixture stored in tanks for subsequent distribution. In this technique, heavy machinery is required not only to pump the bulk of liquefied fish silage but also for the fish to be minced in sufficiently fine form and agitated to minimise the duration of agitation and liquefaction.

It has now been found that the problems associated with handling and mixing minced fish may be minimised using a comparatively simple technique.

It is an object of the present invention to eliminate (a) the need for fine mincing, (b) the conveying of solid minced fish, (c) the mixing of a solid mass after addition of acid and (d) the need for heavy duty equipment.

Accordingly, the present invention is a process for producing fish silage comprising mixing fish with preformed liquid fish silage and an additive capable of initiating and accelerating the liquefaction process.

The mixing may be carried out in a tank using any of the conventional mechanical mixers. Since heavy duty equipment is unnecessary, the process of the present invention is relatively flexible in the choice of mixers. Thus, examples of mixers that may be used include turbine mixers, paddle mixers, propeller mixers, tumble mixers and the centrifugal impeller type mixers. A chopper pump is preferable as a mixer.

One of the principal advantages of the present invention is that small and medium sized fish e.g. up to 6 in $\times$ 15 in need not be chopped or minced prior to the mixing stage. Under the conditions of mixing now proposed these are automatically minced and liquefied without becoming unmanageably viscous and therefore do not add undue strain on the mixers or the pumping equipment. However, if relatively large sized fish, for example dog fish, is to be liquefied, it may be desirable to chop such fish to a suitable size, preferably within that specified above for small and medium size fish, for ease of operation. As will be appreciated by those skilled in the art, it is not necessary to use whole fish to operate the process of the present invention. Fish waste, fish offal and other scrap from the fishing industry preminced or otherwise, may be used as feed to the mixing stage.

The additives which are capable of initiating and accelerating the liquefaction process may be selected from organic acids, mineral acids, salts thereof, some specific enzymes, for example papain and mixtures of these. Acids, especially organic acids, are preferable and these may be the lower monocarboxylic acids such as formic acid and propionic acid. Formic acid however is most preferable. The additive may be added to the fish either prior to the mixing stage, e.g. during the preliminary chopping or mincing stage if such a step is carried out, or, during the mixing stage.

The ratio of the additive to the fish feed in the mixture at the time of mixing in the tank is suitably between 0.5 and 30% by weight, preferably between 1.0 and 5.0% by weight. Within these ranges the optimum concentrations will naturally depend upon the type of fish being liquefied, e.g. the water and the oil content thereof and the like, and the amount of preformed liquid fish silage in the mixture.

The ratio of preformed liquid fish silage to the fish feed is suitably between 10:1 and 1:10 by weight, preferably between 2:1 and 1:3 by weight.

In starting the operation it will be necessary to obtain the first supply of fish silage. This may be achieved by agitating minced fish with warm water along with any of the conventional additives, preferably those which supply the necessary acid environment to produce a pH of 4 or below to ensure against bacterial spoilage. When all the fish has become liquefied at least part of the mixture is pumped to store.

Using part of this liquefied fish as the medium a first batch of fish and additive are liquefied, according to the invention by constant and rapid agitation.

A second batch of fish may be similarly liquefied and this can then be divided, one part retained for further fish addition, and the remainder put to store. After five or six such operations the silage produced is of substantially the same nutritional value as the fish being used and continuous operation in this manner can be carried out indefinitely.

Silage produced at the starting up stage is still a valuable feed and can be used for pig feed with the diet suitably adjusted for the excess water present.

The rate at which fish is liquefied depends upon the type of raw material, its freshness and the temperature of the process. It has been found that fatty fish liquefy more quickly than white fish offal and fresh fish are much easier to liquefy than stale fish. It is therefore desirable to subject fish to the liquefaction process immediately on receipt of the raw material.

The liquefaction process is also temperature dependent. Temperatures of at least 20° C. are desirable and temperatures between 20° and 40° C. are preferable. At higher temperatures enzymes responsible for liquefaction have been found to deactivate.

The invention is further illustrated with reference to the accompanying drawings:

APPARATUS

A mixing tank (1) is provided with a chopper pump (2) capable of recycling into the tank (1) via one-way valve (3) or pumping to store (A) and (B) via outlet (4) and inlet pipes (5) and (6) respectively for fish feed and aqueous formic acid. The outlet (4) is connected to storage tanks (A) and (B) via one-way valves (7), (8) and (9). A pump (12) is connected to each of the storage tanks (A) and (B) to withdraw liquid fish silage therefrom via one-way valves (10) and (11) respectively. Pump (12) is further connected to the mixing tank (1) via one-way valve (15) and back to the storage tanks (A) and (B) for recirculation via one-way valves (14) and (8), and (14) and (9) respectively.

PROCESS 1. 0.5 ton of fish is fed at a steady rate along with 3.5 gallons of formic acid (3.5% by weight of 85% formic acid) via inlet pipes (5) and (6) respectively into a mixing tank (1) containing 0.5 ton of warm water (30° to 40° C.).

2. The agitation and circulation of the mixture in tank (1) is started by closing valve (7) and opening valve (3), and the circulation continued for one hour.

3. Thereafter, half the liquid in the mixing tank (1) is pumped into storage tank (A) by closing valves (3) and (9) and opening valves (7) and (8). Liquid pumped into storage tank (A) is recirculated continuously by opening valves (8), (10), (13) and (14) closing valve (15) and starting the pump (12).

4. Circulation and agitation in mixing tank (1) is continued by closing valve (7) and opening valve (3). Simultaneously, a further 0.5 ton of fish and 3.5 gallons of formic acid are added, as before, to the mixing tank (1) via inlet (5) and mixing continued for another 0.5 hour. Then a further 1 ton of fish and 7 gallons of formic acid are added, as before, to the mixing tank (1) and agitation and circulation continued.

5. Operations 3 and 4 above are repeated to produce fish silage continuously.

I claim:

1. A process for preparing liquified fish silage which comprises admixing unground fish solids having dimensions up to 6 inches by 15 inches with liquified fish silage in a ratio in the range of from 10:1 to 1:10 by weight and an additive present in at least an amount capable of initiating and accelerating liquifaction of said fish solids, the additive being selected from the group consisting of organic acids, mineral acids, salts thereof, and enzymes; and effecting liquifaction of said fish solids in the presence of said liquified fish silage and at a temperature of at least 20° C.

2. A process according to claim 1 wherein the mixing is carried out in a tank using a mechanical mixer.

3. A process according to claim 2 wherein the mechanical mixer is a chopper pump.

4. A process according to claim 1 wherein the organic acid is a lower monocarboxylic acid.

5. A process according to claim 4 wherein the lower monocarboxylic acid is formic acid.

6. A process according to claim 1 wherein the ratio of the additive to the solid fish feed in the mixture is between 0.5 and 30% by wt.

7. A process according to claim 6 wherein the ratio of the additive to the solid fish feed in the mixture is between 1.0 and 5.0% by wt.

8. A process according to claim 1 wherein the ratio of preformed liquid fish silage to the solid fish feed is between 2:1 and 1:3 by wt.

9. A process according to claim 1 wherein the liquefaction is carried out at temperature between 20° and 40° C.

10. A process as defined in claim 1 wherein said liquified fish silage admixed with said fish solids has been obtained by the process of claim 1.

11. A cyclic process for the production of liquified fish silage which process comprises mixing unground fish solids having dimensions up to 6 inches by 15 inches with liquified fish silage from a previous cycle in a ratio in the range 10:1 to 1:10 by weight and from 0.5 to 30% by weight, expressed as a percentage by weight of fish solids, of an additive capable of initiating and accelerating liquification of the fish solids, the additive being selected from the group consisting of organic acids, mineral acids, salts thereof and enzymes; effecting liquifaction of the fish solids to liquified fish silage in the presence of the preformed liquified fish silage at a temperature of at least 20° C.; withdrawing at least a portion of the resulting liquified fish silage; adding to the remaining liquified fish silage if only some is withdrawn, or to recycled liquified fish silage if all is withdrawn, a further quantity of fish solids of the dimensions and in the weight ratio previously specified, and a further quantity of an additive as previously specified and in the percentage weight range previously specified; and repeating the cycle.

* * * * *